(12) United States Patent
Kelly et al.

(10) Patent No.: US 12,480,935 B2
(45) Date of Patent: Nov. 25, 2025

(54) ANALYSIS OF A BIOLOGICAL SAMPLE USING TAPE-TO-TAPE FLUIDIC TRANSFER

(71) Applicant: Sean Kelly, Yorba Linda, CA (US)

(72) Inventors: Sean Kelly, Yorba Linda, CA (US); Kevin M. Kelly, Chesterton, IN (US)

(73) Assignee: Sean Kelly, Yorba Linda, CA (US)

( * ) Notice: Subject to any disclaimer, the term of this patent is extended or adjusted under 35 U.S.C. 154(b) by 807 days.

(21) Appl. No.: 17/789,420

(22) PCT Filed: Dec. 24, 2020

(86) PCT No.: PCT/US2020/067014
§ 371 (c)(1),
(2) Date: Jun. 27, 2022

(87) PCT Pub. No.: WO2021/134014
PCT Pub. Date: Jul. 1, 2021

(65) Prior Publication Data
US 2023/0044307 A1    Feb. 9, 2023

Related U.S. Application Data

(60) Provisional application No. 62/954,072, filed on Dec. 27, 2019.

(51) Int. Cl.
| | | |
|---|---|---|
| *G01N 33/487* | (2006.01) | |
| *B01L 3/00* | (2006.01) | |
| *G01N 1/28* | (2006.01) | |
| *G01N 35/00* | (2006.01) | |

(52) U.S. Cl.
CPC ...... *G01N 33/487* (2013.01); *B01L 3/502715* (2013.01); *G01N 35/00009* (2013.01); *B01L 2200/027* (2013.01); *G01N 1/2813* (2013.01); *G01N 2001/2833* (2013.01)

(58) Field of Classification Search
CPC .......... G01N 33/487; G01N 35/00009; G01N 1/2813; G01N 2001/2833; B01L 3/502715; B01L 2200/027; B01L 2300/123; B01L 3/502707
See application file for complete search history.

(56) References Cited

U.S. PATENT DOCUMENTS

| | | |
|---|---|---|
| 3,502,438 A | 3/1970 | Natelson |
| 3,526,480 A | 9/1970 | Findl et al. |
| 3,620,678 A | 11/1971 | Guigan et al. |
| 2011/0065590 A1 | 3/2011 | Hunter |
| 2012/0006105 A1 | 1/2012 | Zimmer et al. |
| 2012/0273112 A1 | 11/2012 | Dagenbach et al. |
| 2017/0028376 A9 | 2/2017 | Hunter et al. |

*Primary Examiner* — Brian J. Sines
(74) *Attorney, Agent, or Firm* — Morgan, Lewis & Bockius LLP

(57) ABSTRACT

Methods and devices for testing a biological sample are provided. A tape includes multiple channels or reservoirs having inlet and outlet ports. One tape having biological sample disposed in its channels is temporarily mated with another tape having reagents disposed in its channels via a serpentine belt and compression roller assembly. Pulsed fluidic operations combine the reagents and the biological sample for subsequent observation, detection, storage and/or disposal. Fluidic transfer is provided in a uniform operation or in conjunction with a sensory feedback assembly.

25 Claims, 12 Drawing Sheets

ANALYSIS OF A BIOLOGICAL SAMPLE USING TAPE-TO-TAPE FLUIDIC TRANSFER

CROSS-REFERENCE TO RELATED APPLICATIONS

This application is a national stage application of International Patent Application No. PCT/US2020/067014, filed Dec. 24, 2020, which claims the benefit of priority of U.S. Patent Application No. 62/954,072, filed Dec. 27, 2019, which are incorporated by reference herein in their entirety.

TECHNICAL FIELD

The present disclosure relates generally to devices and methods for fluidic transfer related to a biological sample such as a bodily fluid sample.

BACKGROUND

Testing of bodily fluids has become essential for medical purposes, such as for preventative health care, detection of disease or medical conditions, or monitoring of treatment regimens. As new diseases and disease markers are being identified every day, coupled with new drugs and herbal treatments for diseases, medical conditions, genetic testing/modification, the number and complexity of tests based on subject bodily fluids has increased dramatically.

Typical testing of bodily fluids includes manually testing of individual elements and automated systems for conducting higher volumes of bodily fluid tests. A key element of bodily fluid testing involves bringing a particular reagent into contact with a bodily fluid sample and monitoring or detecting the result. In some testing processes, the reagent is introduced into a container holding a bodily fluid sample, while in other processes the bodily fluid sample is introduced into a container holding the reagent.

Providing for high-speed mixing or transfer of reagents and bodily fluid samples would provide for better testing and treatment outcomes for subjects. Accordingly, there is a need for improved methods of detection and diagnosis of conditions based on bodily fluid samples, as well as methods for monitoring the progression of medical conditions and monitoring the progress of various treatments, including tape-to-tape fluidic transfer.

SUMMARY

In one or more embodiments, methods for testing a biological sample (e.g., a bodily fluid of a subject) are provided. The methods include providing a first tape comprising a plurality of channels, each channel having one or more channel ports; disposing a sample of the biological sample (e.g., bodily fluid) into a first channel; providing a second tape comprising a plurality of inlet/outlet ports; engaging the first tape with the second tape to align a first inlet/outlet port with a first channel port of the first channel; and introducing a reagent into the first channel through the first inlet/outlet port and the aligned first channel port.

Also provided herein are methods for testing a biological sample (e.g., a bodily fluid of a subject) that include providing a tape comprising a plurality of channels, each channel having one or more channel ports and a plurality of inlet/outlet ports, wherein the tape comprises a first kinetic axis defined by a longitudinal edge of the tape; disposing the biological sample (e.g., bodily fluid) into a first channel; aligning a first inlet/outlet port with a device for introduction of gas and/or fluid into the first inlet/outlet port; and introducing a gas and/or fluid (e.g., a fluid containing a reagent) into the first channel through the first inlet/outlet port. The methods further comprise moving the tape along the first kinetic axis.

In some embodiments of each or any of the above- or below-mentioned embodiments, the methods further comprise withdrawing a portion of the reagent from the first channel via a second channel port aligned with a second inlet/outlet port.

In some embodiments of each or any of the above- or below-mentioned embodiments, the methods further comprise withdrawing a portion of the biological sample (e.g., bodily fluid) from the first channel via a second channel port aligned with a second inlet/outlet port.

In some embodiments of each or any of the above- or below-mentioned embodiments, the methods further comprise withdrawing a mixture of the biological sample (e.g., bodily fluid) and the reagent from the first channel via a second channel port aligned with a second inlet/outlet port.

In some embodiments of each or any of the above- or below-mentioned embodiments, the first tape comprises a first kinetic axis defined by a longitudinal edge of the first tape, and wherein the first tape is configured to be moved along the first kinetic axis.

In some embodiments of each or any of the above- or below-mentioned embodiments, the second tape comprises a second kinetic axis defined by a longitudinal edge of the second tape, and wherein the second tape is configured to be moved along the second kinetic axis.

In some embodiments of each or any of the above- or below-mentioned embodiments, the first channel is disposed on the first tape along a fluidic axis, wherein the fluidic axis is orthogonal to the kinetic axis.

In some embodiments of each or any of the above- or below-mentioned embodiments, the first channel is configured to retain any of the biological sample (e.g., bodily fluid), the reagent and a combination thereof during movement of the first tape along the kinetic axis.

In some embodiments of each or any of the above- or below-mentioned embodiments, the engaging the first tape with the second tape comprises compressing the first and second tapes together with compression rollers.

In some embodiments of each or any of the above- or below-mentioned embodiments, the first tape and the second tape are moved by a serpentine belt assembly.

In some embodiments of each or any of the above- or below-mentioned embodiments, the serpentine belt assembly provides circuitous pass-through for tape-to-tape transfer of mated port faces.

In some embodiments of each or any of the above- or below-mentioned embodiments, the serpentine belt assembly provides high-speed mixing or transfer under high confinement (e.g., to prevent the burst pressure of the channels or wells on the tape from being exceeded).

In some embodiments of each or any of the above- or below-mentioned embodiments, the methods further comprise disposing an initial reagent in the first channel prior to disposing the biological sample (e.g., bodily fluid) in the first channel.

In some embodiments of each or any of the above- or below-mentioned embodiments, the methods further comprise introducing a second reagent into the first channel through the first inlet/outlet port and the aligned first channel port.

In some embodiments of each or any of the above- or below-mentioned embodiments, the methods further comprise withdrawing a portion of the second reagent from the first channel via the second channel port through the second inlet/outlet port.

In some embodiments of each or any of the above- or below-mentioned embodiments, the methods further comprise withdrawing a portion of the biological sample (e.g., bodily fluid) from the first channel via the second channel port through the second inlet/outlet port.

In some embodiments of each or any of the above- or below-mentioned embodiments, the methods further comprise withdrawing a mixture of the biological sample (e.g., bodily fluid) and the second reagent from the first channel via the second channel port through the second inlet/outlet port.

In some embodiments of each or any of the above- or below-mentioned embodiments, the methods further comprise withdrawing a mixture of the biological sample (e.g., bodily fluid), the first reagent and the second reagent from the first channel via the second channel port through the second inlet/outlet port.

In some embodiments of each or any of the above- or below-mentioned embodiments, the methods further comprise moving the first tape relative to the second tape to align a third inlet/outlet port with the first channel port of the first channel and a fourth inlet/outlet port with the second channel port of the first channel.

In some embodiments of each or any of the above- or below-mentioned embodiments, the methods further comprise introducing a second reagent into the first channel through the third inlet/outlet port and the aligned first channel port.

In some embodiments of each or any of the above- or below-mentioned embodiments, the methods further comprise withdrawing a portion of the second reagent from the first channel via the second channel port through the fourth inlet/outlet port.

In some embodiments of each or any of the above- or below-mentioned embodiments, the methods further comprise withdrawing a portion of the biological sample (e.g., bodily fluid) from the first channel via the second channel port through the fourth inlet/outlet port.

In some embodiments of each or any of the above- or below-mentioned embodiments, the methods further comprise withdrawing a mixture of the biological sample (e.g., bodily fluid) and the second reagent from the first channel via the second channel port through the fourth inlet/outlet port.

In some embodiments of each or any of the above- or below-mentioned embodiments, the methods further comprise withdrawing a mixture of the biological sample (e.g., bodily fluid), the first reagent and the second reagent from the first channel via the second channel port through the fourth inlet/outlet port.

In some embodiments of each or any of the above- or below-mentioned embodiments, the reagent is introduced into the first channel by compressive force.

In some embodiments of each or any of the above- or below-mentioned embodiments, the reagent is introduced into the first channel by air pressure.

In some embodiments of each or any of the above- or below-mentioned embodiments, the reagent is introduced into the first channel by a heating process.

In some embodiments of each or any of the above- or below-mentioned embodiments, the methods further comprise engaging a third tape with the first tape, wherein the third tape and the second tape are disposed on opposite sides of the first tape.

In some embodiments of each or any of the above- or below-mentioned embodiments, the third tape is configured to block the channel ports on that side of the first tape.

In some embodiments of each or any of the above- or below-mentioned embodiments, the methods further comprise engaging a fourth, fifth, sixth, seventh, eighth, ninth, tenth, or more tapes with either the first, second, or third tape.

In some embodiments of each or any of the above- or below-mentioned embodiments, the first tape comprises engagement openings disposed along first and second longitudinal sides.

In some embodiments of each or any of the above- or below-mentioned embodiments, the engagement openings are configured to be received by gear teeth, and wherein movement of the gear teeth causes movement of the first tape along the first kinetic axis.

In some embodiments of each or any of the above- or below-mentioned embodiments, the second tape comprises engagement openings disposed along first and second longitudinal sides.

In some embodiments of each or any of the above- or below-mentioned embodiments, the engagement openings are configured to be received by gear teeth, and wherein movement of the gear teeth causes movement of the second tape along the second kinetic axis.

In some embodiments of each or any of the above- or below-mentioned embodiments, the methods further comprise observing a reaction from mixing the first reagent and the biological sample (e.g., bodily fluid) in the first channel.

In some embodiments of each or any of the above- or below-mentioned embodiments, the reaction is a change in color.

In some embodiments of each or any of the above- or below-mentioned embodiments, the methods further comprise introducing the withdrawn mixture of the biological sample (e.g., bodily fluid) and the reagent to a test assembly; and observing a reaction from the mixture of the biological sample (e.g., bodily fluid) and the reagent with the test assembly.

In some embodiments of each or any of the above- or below-mentioned embodiments, the methods further comprise providing a selectable and adaptable intermittent assembly of purposeful fluidic layers.

In some embodiments of each or any of the above- or below-mentioned embodiments, the first tape includes a plurality of layers comprising: a first channel layer having a first plurality of channels disposed thereon; a first port layer having a first plurality of channel ports and a first plurality of inlet/outlet ports, each aligned with the first plurality of channels; and a backing layer, wherein the first channel layer is sandwiched between the first port layer and the backing layer.

In some embodiments of each or any of the above- or below-mentioned embodiments, the second tape includes a plurality of layers comprising: a second channel layer having a second plurality of channels and a second plurality of inlet/outlet ports disposed thereon; a second port layer having a second plurality of channel ports aligned with the second plurality of channels and a third plurality of inlet/outlet ports; and a third port layer having a fourth plurality of inlet/outlet ports, wherein the channel layer is sandwiched between the second and third port layers, and wherein the second, third and fourth inlet/outlet ports are aligned.

In some embodiments of each or any of the above- or below-mentioned embodiments, the engaging the first tape with the second tape provides a serpentine flow path in through an aligned set of second, third and fourth inlet/outlet ports, into a first inlet/outlet port, through a first channel, out a first channel port into a second channel port, through a second channel and out another fourth inlet/outlet port.

In one or more embodiments, methods for testing a biological sample (e.g., bodily fluid) of a subject are provided. The methods include providing a first tape comprising a plurality of channels, each channel having one or more channel ports; disposing a reagent into a first channel; providing a second tape comprising a plurality of inlet/outlet ports; engaging the first tape with the second tape to align a first inlet/outlet port with a first channel port of the first channel; and introducing a sample of the biological sample (e.g., bodily fluid) into the first channel through the first inlet/outlet port and the aligned first channel port.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The foregoing summary, as well as the following detailed description of the disclosure, will be better understood when read in conjunction with the appended figures. For the purpose of illustrating the disclosure, shown in the figures are embodiments which are presently preferred. It should be understood, however, that the disclosure is not limited to the precise arrangements, examples and instrumentalities shown.

DETAILED DESCRIPTION

Figure 1:
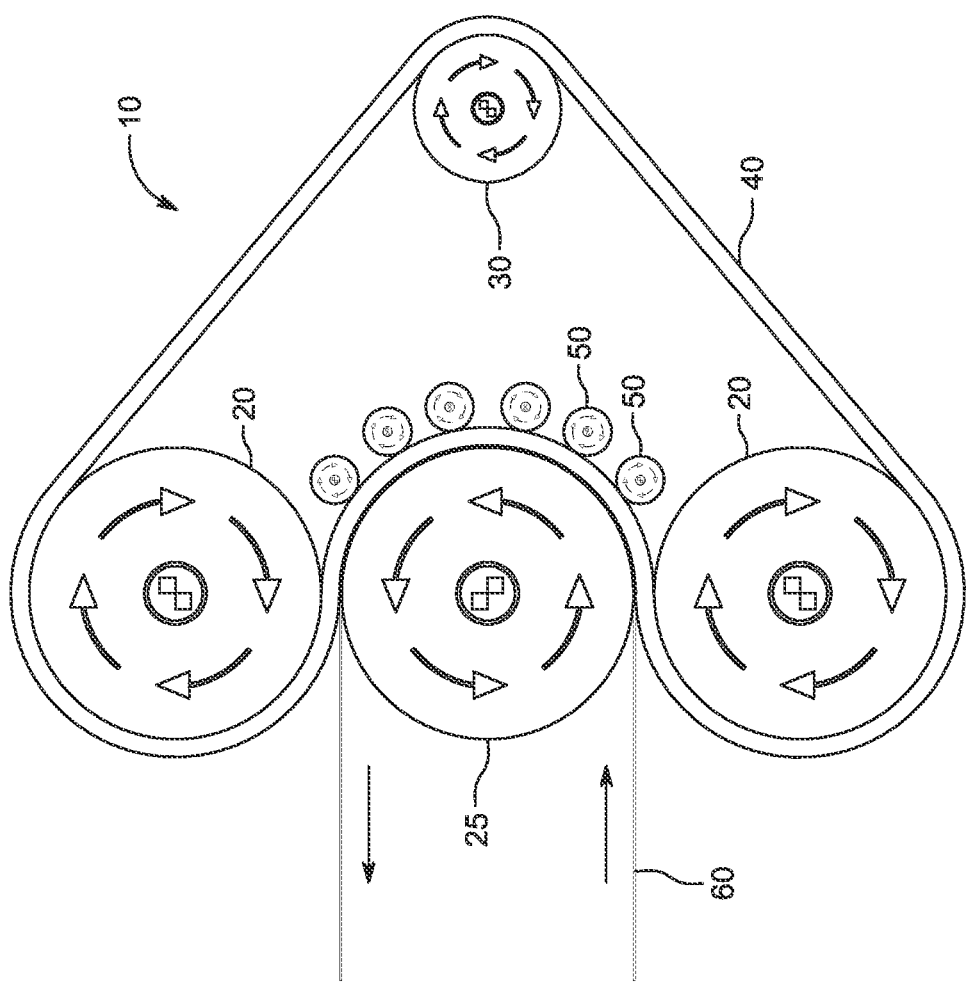
FIG. 1 is a front view of a fluidic transfer assembly including a single tape.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The testing of biological sample (e.g., bodily fluid) is often a laborious or time consuming process. The present disclosure provides systems and methods for high-speed fluidic transfer and/or mixing during testing of a biological sample. Such systems and methods may provide for movement of biological sample perpendicular to its kinetic axis and provide for pulsed fluidic operations between a sample carrier tape and a fluidic operations roller. Advantageously, such disclosed systems circumvent the normal fluidic "speed limit" (i.e. navier stokes equations) limiting the speed with which molecular targets (and e.g., their attached probes) may pass through a flow cell presenting before a detection device. Preferably, the sample carrier tape (e.g., a laminated or thermoformed tape) is subjected to rigid confinement so that the burst pressure of the channels (e.g., wells, reservoirs) on the tape can be exceeded without compromising the integrity of the tape. For example, the fluidic operations roller may comprise one or more compression rollers that operate in conjunction with a serpentine belt assembly to provide rigid confinement (e.g., persistent or momentary confinement) of the tape including, for example, by a serpentine belt or rollers to mitigate or prevent the burst pressure of the channels or wells on the tape from being exceeded. Advantageously, such rigid confinement permits the introduction of a biological sample and/or a liquid(s) into the channel under conditions that provide a turbulent flow in order to facilitate improved (e.g., faster) mixing. The sample carrier tape may have multiple separate channels, each having a biological sample (e.g., bodily fluid) disposed in the channel. One or more reagents or activation processes may be introduced to the biological sample (e.g., bodily fluid) in the channel during the pulsed fluidic operation.

In an embodiment, methods for testing a biological sample (e.g., a bodily fluid of a subject) are provided. The methods include providing a first tape comprising a plurality of channels, each channel having one or more channel ports; disposing a sample of the biological sample (e.g., bodily fluid) into a first channel; providing a second tape comprising a plurality of inlet/outlet ports; engaging the first tape with the second tape to align a first inlet/outlet port with a first channel port of the first channel; and introducing a reagent into the first channel through the first inlet/outlet port and the aligned first channel port. Advantageously, such methods provide for the establishment of a kinetic axis that is perpendicular to the process axis (the direction of movement of the first tape), selectable and adaptable intermittent (e.g., non-persistent) assembly of the first and second tape, high speed mixing of transfer of a gas and/or fluid from the second tape to the first tape (or vice versa) under persistent or momentary high confinement including, for example, by a serpentine belt or rollers to mitigate or prevent the burst pressure of the plurality of channels on the first and second tapes. Further, the first tape and the second tape provide a continuous pass through for tape to tape transfer of mated ports.

In one embodiment, the first and the second tape are moved at about 1 foot/minute, about 2 feet/minute, about 3 feet/minute, about 4 feet/minute, about 5 feet/minute, about 6 feet/minute, about 7 feet/minute, about 8 feet/minute, about 9 feet/minute, about 10 feet/minute, about 20 feet/minute, about 30 feet/minute, about 40 feet/minute, about 50 feet/minute, about 60 feet/minute, about 70 feet/minute, about 80 feet/minute, about 90 feet/minute, about 100 feet/minute or more.

In another embodiment, the tape comprises about 5, about 10, about 15, about 20, about 25, about 30, about 35, about 40, about 45, about 50, about 55, about 60, about 65, about 70, about 75, about 80, about 85, about 90, about 95, about 100, or more channels per square inch of the tape.

In certain embodiments, the tape(s) may move intermittently (e.g., in a stop start manner) for a period of time to permit a reaction or binding event to occur in a channel.

In an embodiment, the biological sample may include tissues, aerosols, cells, biological fluids and isolates thereof, isolated from a subject, as well as tissues, cells and fluids present within a subject (e.g., a patient). Biological samples may comprise cells, most preferably tumor cells, that are isolated from body samples, such as, but not limited to, smears, sputum, biopsies, secretions, cerebrospinal fluid, bile, blood, lymph fluid, urine and feces, or tissue which has been removed from organs, such as breast, lung, intestine, skin, cervix, prostate, and stomach. Biological samples may also include sections of tissues such as frozen sections taken for histological purposes.

In an embodiment, the biological sample comprises biomarkers for a disease or disorder such as Alzheimer's disease. In a further embodiment, the biomarkers include tau protein.

In some embodiments of each or any of the above or below mentioned embodiments, the biological sample may include a liquid sample such as an aspirate, blood, plasma, serum, sputum, urine, or saliva. In a preferred embodiment, the liquid biopsy is a blood sample.

In an embodiment, the biological sample may be present in a first channel of the first tape and then bought into contact with one or more reagents contained within a first channel on a second tape by introducing the one or more reagents into the first channel of the first tape through a first inlet/outlet port on the first tape. Such one or more reagents in the second tape may be introduced into the first channel of the first tape by applying a force from a serpentine belt or confinement roller.

In an embodiment, one or more reagents may be disposed within the sample carrier tape. Here, the pulsed fluidic operation may introduce one or more biological sample (e.g., bodily fluid) to a channel containing a reagent during the pulsed fluidic operation.

In an embodiment, reagents, immuno-capture matrices, primers, probes, oligonucleotides, peptides, enzymes, etc. are addressed to one or more channels in a portion of the tape. In another embodiment, a number of addressed channels form an addressed frame, a number of addressed frames form an addressed section of tape, or a number of addressed sections form a length of the tape. The addressed channels, addressed frames, addressed sections, or length of the tape may comprise the same or different reagents, immuno-capture matrices, primers, probes, oligonucleotides, peptides, enzymes, etc.

In an embodiment, an addressed portion of a length of tape is dedicated to amplification and/or detection of chromosomes, genes, or other subordinate targets of a human genome (e.g., an arm of a chromosome, a regions of a chromosome, a band of a chromosome, or a sub-band of a chromosome), an exome, a proteome, an immunome, or a microbiome. For example, a human genome may be amplified in spatially addressed channels. Additionally, for example, the length of tape dedicated to a chromosome, a region of a chromosome, a band of a chromosome, or a sub-band of a chromosome would only has primers specific to a nucleotide sequence of interest that resides within that chromosome, band of a chromosome, or sub-band of a chromosome. In the systems and methods disclosed herein, a fluidic transfer may be provided from one tape to another tape. In this manner, a reagent in a channel of one tape may be combined with a biological sample (e.g., bodily fluid) in a channel of the other tape.

The systems and methods disclosed herein advantageously increase the quantity of biological (e.g., bodily fluid) samples that can be tested based on the high-speed fluidic operations. The systems and methods disclosed herein also advantageously reduce the costs associated with testing biological (e.g., bodily fluid) samples by automating high-speed fluidic operations with a belt and roller assembly.

FIG. 1 shows a fluidic transfer assembly 10 having several belt rollers 20, a tension roller 30 and a serpentine belt 40. In this example, the belt rollers 20 provide movement to the serpentine belt 40, which has a winding path along the belt rollers 20. The tension roller 30 may be disposed away from the belt rollers 20 and provide for adjusting the tension on the serpentine belt 40. For example, moving the tension roller 30 away from the belt rollers 20 may increase the tension on the serpentine belt 40.

The fluidic transfer assembly 10 may also include one or more compression rollers 50. For example, several compression rollers 50 may be disposed around a portion of a fluidic operations roller 25. Also, a sample carrier tape 60 may feed around the fluidic operations roller 25, with the serpentine belt 40 disposed between the sample carrier tape 60 and the compression rollers 50. Accordingly, selective compression of the compression rollers 50 onto the serpentine belt 40 causes a corresponding compression on the sample carrier tape 60, thus causing a pulsed fluidic operation on an associated portion of the sample carrier tape 60.

Thus, the compression rollers 50 may augment the serpentine belt 40 under tension from the tension roller 30 in order to provide a high confinement backstop as pulsed fluidic operations occur between the fluidic operations roller 25 and the sample carrier tape 60. This affords a duration for pulsed fluidic operations corresponding to 180 degrees of the fluidic operations roller 25 in its rotation. For example, for the fluidic operations roller 25 spinning at one rotations per second, the 180 degree pulsing region provides one half of a second for a rapid fluidic operation.

A fluidic operation may be any of a range of process operations. For example, a fluid may be injected into a channel or opening on the sample carrier tape 60. Similarly, a fluid may be forced out or ejected from the channel or opening on the sample carrier tape 60. Another fluidic operation may be mixing a fluid from one channel with a substance or fluid from another channel. A fluidic operation may also be providing an energy source to a sample disposed on the sample carrier tape 60. The energy source may provide for any of heating, cooling, irradiating, illuminating, optically detecting, sonic or ultrasonic vibrating, magnetic or inductive manipulating, and the like, for example.

The fluidic operations may be performed uniformly, such as a consistently pulsed time interval or a consistent distance between reagents or biological (e.g., bodily fluid) samples on the sample carrier tape 60. As another example, the fluidic operations may be performed in conjunction with a sensory feedback, such as a servo and/or a sensor assembly.

Figure 2:
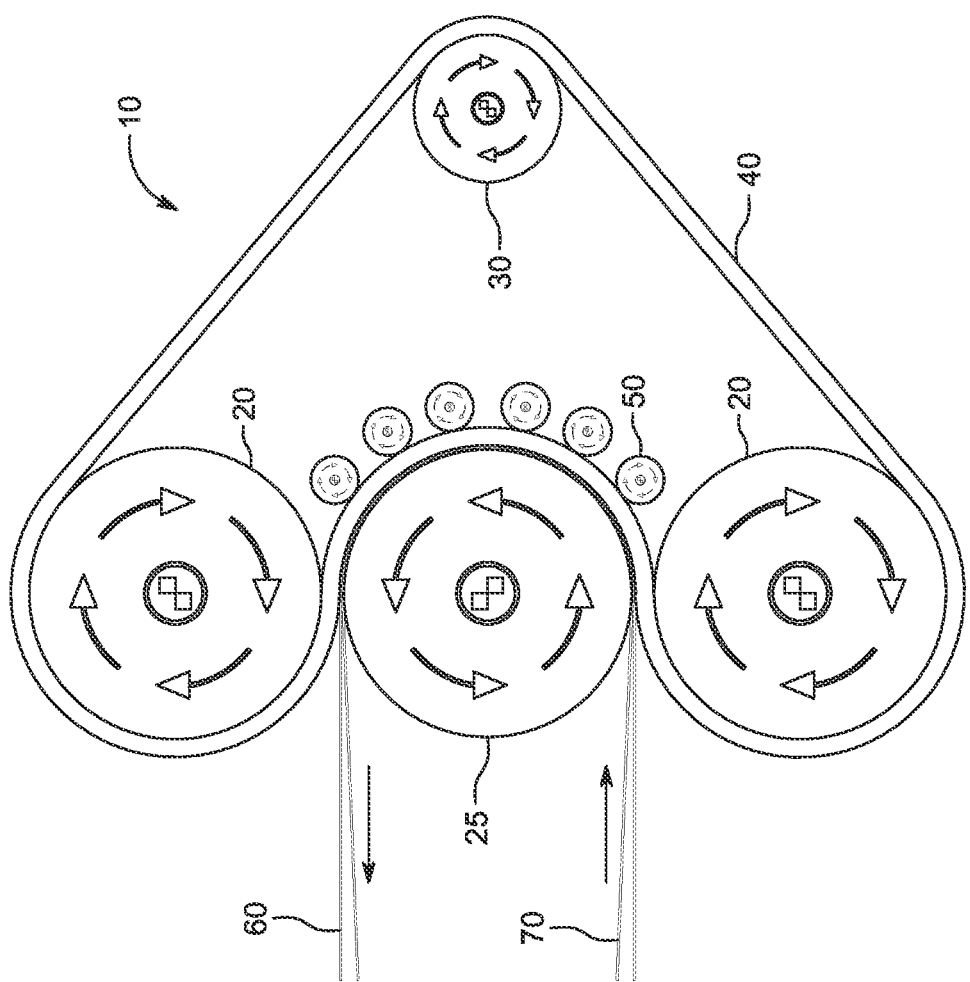
FIG. 2 is a front view of the fluidic transfer assembly of FIG. 1 including two tapes.

FIG. 2 shows another example for providing fluidic operations on reagents or biological (e.g., bodily fluid) samples on the sample carrier tape 60. Here, a reagent carrier tape 70 is also disposed around the fluidic operations roller 25 so that both the sample carrier tape 60 and the reagent carrier tape 70 are sandwiched between the fluidic operations roller 25 and the serpentine belt 40. Similarly to the previous example, a duration for pulsed fluidic operations corresponds to 180 degrees of the fluidic operations roller 25 in its rotation, where the sample carrier tape 60 and the reagent carrier tape 70 move together around the fluidic operations roller 25. Thus, any of the above-described fluidic operations may be performed on or between the sample carrier tape 60 and the reagent carrier tape 70 during the pulsed time interval (e.g., one half second).

For example, the compression rollers 50 may cause a fluid containing a reagent to transfer from a channel or opening in the reagent carrier tape 70 to a biological sample (e.g., bodily fluid) disposed on the sample carrier tape 60. Other fluidic operations may be performed at the same time, such as providing heating, cooling, irradiation and the like before, during and/or after the fluid transfer fluidic operation.

Thus, the devices and methods in the present disclosure provide for providing one or more testing steps upon a biological (e.g., bodily fluid) sample disposed on the sample carrier tape 60 while the tape is being moved around the fluidic operations roller 25. For example, a testing reagent may be injected from either a reagent input source or a portion of the reagent carrier tape 70 into a channel or opening on the sample carrier tape containing a biological (e.g., bodily fluid) sample, while at the same time applying heat from a heat source. Thus, the combination of the reagent with the biological (e.g., bodily fluid) sample and the added heat may then trigger a reaction that may be sensed or observed to provide testing information for that biological sample (e.g., bodily fluid).

Figure 3:
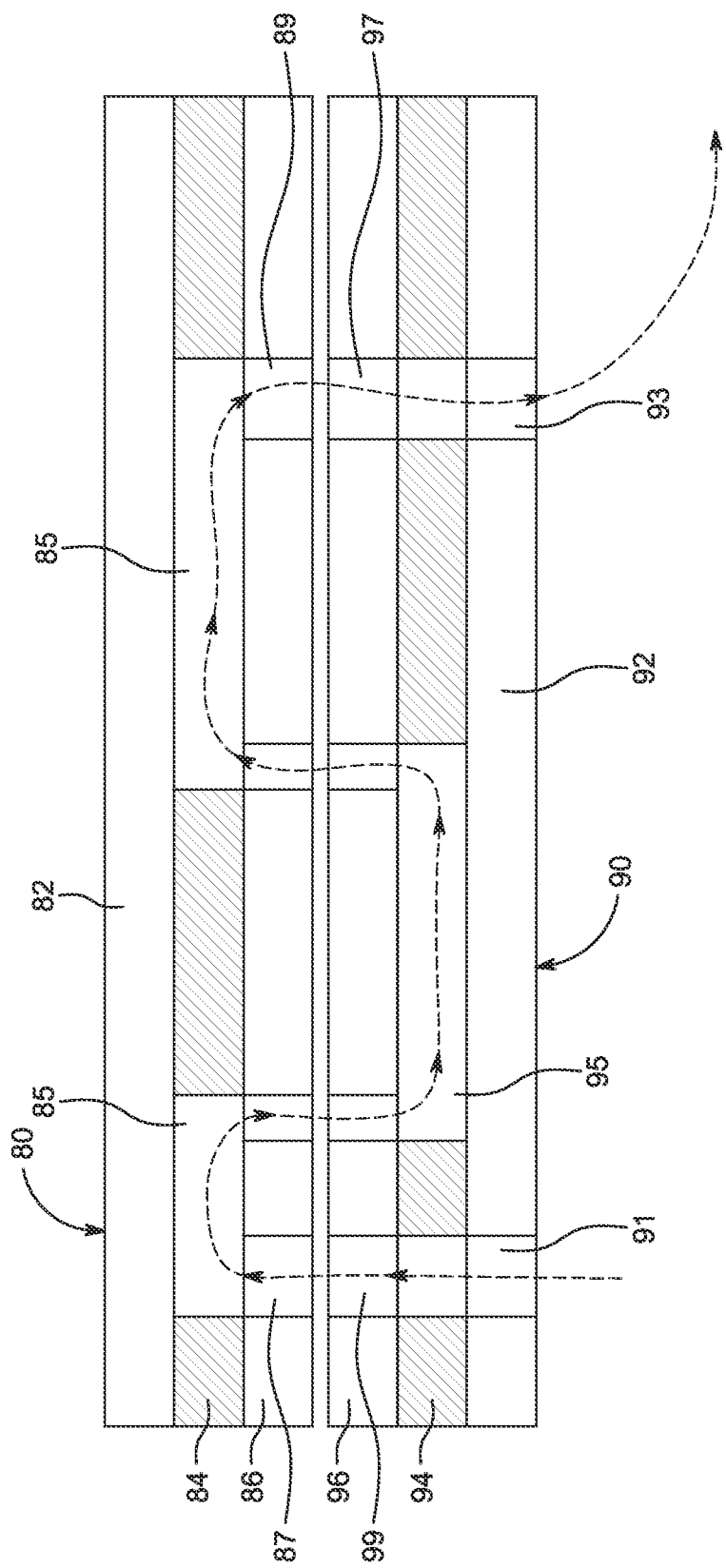
FIG. 3 is a front view of a mated tape pair.

FIG. 3 shows an example of a mated tape pair having an upper mated tape 80 and a lower mated tape 90. For example, the upper mated tape 80 may be a sample carrier tape 60 and the lower mated tape 90 may be a reagent carrier tape 70, or vice versa.

In the example of FIG. 3, the upper mated tape 80 is a multi-layer tape having a base layer 82 (e.g., a sealed exterior layer), an intermediate layer 84 having one or more channels 85 and an interface layer 86 having inlets 87 and outlets 89. In one example, the channels 85 may be configured to contain biological (e.g., bodily fluid) samples to be tested, with each channel 85 having a portion of the same biological (e.g., bodily fluid) sample or each channel 85 having different biological (e.g., bodily fluid) samples. In another example, the channels 85 may be configured to contain one or more reagents, with each channel 85 containing the same type of reagent or each channel 85 having different types of reagents.

In the first case, a fluid containing a reagent may be transferred (e.g., injected) into an inlet 87, flowed across the channel 85 containing the biological (e.g., bodily fluid) sample and out an outlet 86. In the second case, a fluid containing a biological sample (e.g., bodily fluid) may be transferred (e.g., injected) into an inlet 87, flowed across the channel 85 containing a reagent and out an outlet 86.

Continuing with the mated tape pair structure shown in FIG. 3, the lower mated tape 90 is a multi-layer tape having a base layer 92 with a base inlet 91 and a base outlet 93, an intermediate layer 94 having a channel 95, and an interface layer 96 having inlets 97 and outlets 99.

Similarly to the above example, the channels 95 may be configured to contain biological (e.g., bodily fluid) samples to be tested, with each channel 95 having a portion of the same biological (e.g., bodily fluid) sample or each channel 95 having different biological (e.g., bodily fluid) samples. Similarly, the channels 95 may be configured to contain one or more reagents, with each channel 95 containing the same type of reagent or each channel 95 having different types of reagents.

The subject structure provides for a vast array of different fluidic operations that can be taken. For example, the upper mated tape 80 may be a sample carrier tape 60 having a single type of biological (e.g., bodily fluid) sample to be tested disposed in each of the channels 85. Further, the lower mated tape 90 may be a reagent carrier tape 70 having a reagent disposed in the channel 95. Thus, the fluidic operation may include injecting a carrier or neutral fluid into the base inlet 91, which then flows through the lower mated tape 90 into a first inlet 87 to a first channel 85, picks up a quantity of the biological (e.g., bodily fluid) sample disposed in the first channel 85, and carries the biological sample (e.g., bodily fluid) into the channel 95, where it flows over and reacts with the reagent disposed in channel 95. The combined fluid may then flow over the additional biological (e.g., bodily fluid) sample disposed in the second channel 85 and the final combination of fluid may flow out of the base outlet 93 to be tested, stored or disposed of.

In another scenario of the above structure, the initial fluid injected into the base inlet 91 may contain a first reagent, which then may interact with the first bodily sample in the first channel 85, after which the fluid flowing into the channel 95 picks up a second reagent that is then carried into the second channel 85 to interact with a second portion of the same biological (e.g., bodily fluid) sample that is in the first channel 85.

In yet another example, the first channel 85 may contain a first type of biological (e.g., bodily fluid) sample and the second channel 85 contain a second type of biological (e.g., bodily fluid) sample. In another example, first and second channels 85 and channel 95 may all contain different biological (e.g., bodily fluid) samples and a fluid having one or more reagents may flow over all of the different biological (e.g., bodily fluid) samples throughout the fluid pathway created by the upper and lower mated tapes 80, 90. In a further example, first and second channels 85 and channel 95 may contain first, second and third reagents respectively, and a biological (e.g., bodily fluid) sample may flow over all each of the first, second and third reagents throughout the fluid pathway created by the upper and lower mated tapes 80, 90.

The upper mated tape 80 may include any number of channels 85, inlets 87 and outlets 89. For example, a channel 85 may have one corresponding inlet 87 and outlet 89. As another example, a channel 85 may have multiple corresponding inlets 87 and/or outlets 89. The lower mated tape 90 may also have any number of channels 95, base inlets 91/outlets 93 and inlets 97/outlets 99.

Figure 4:
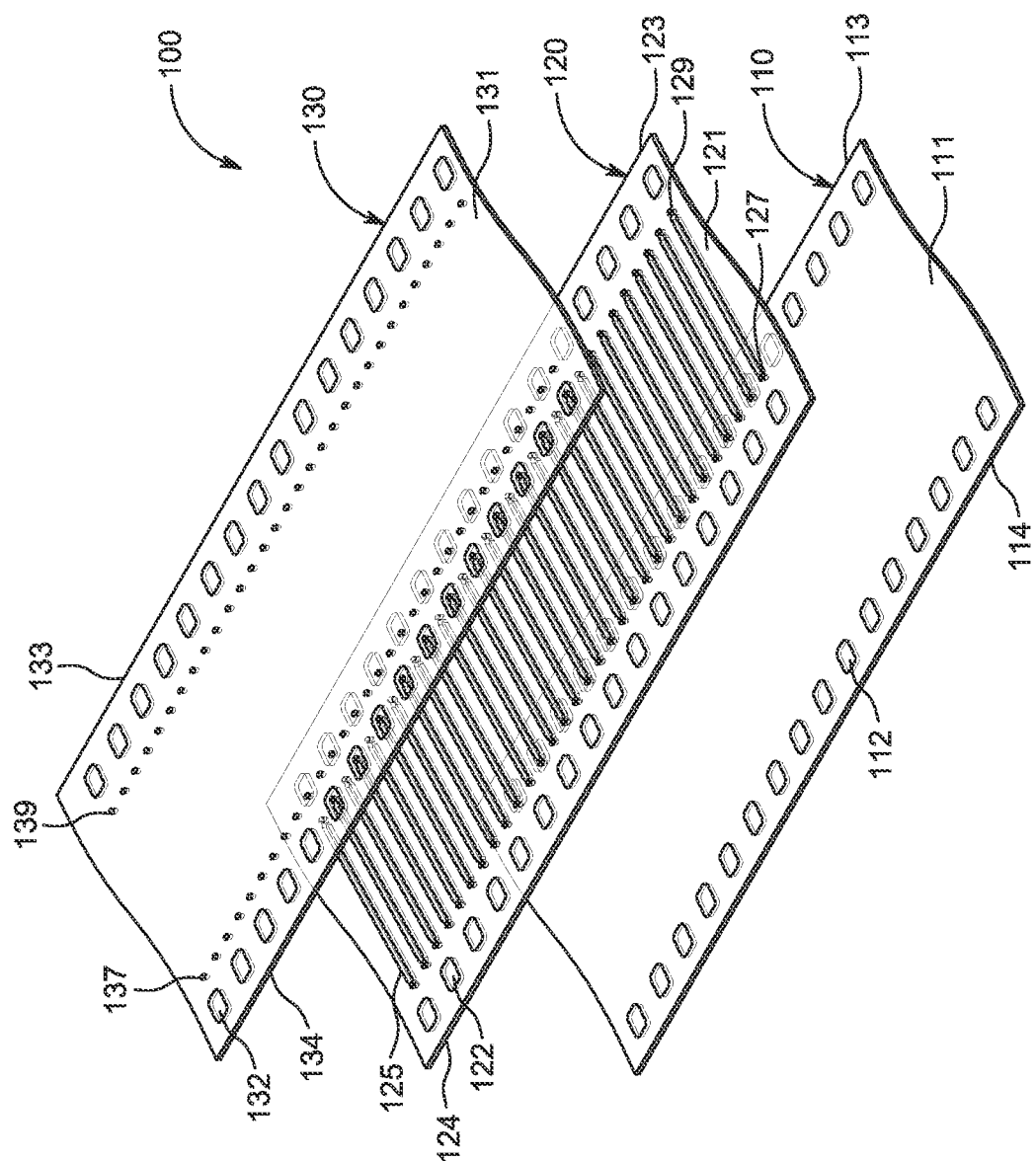
FIG. 4 is an exploded perspective view of a portion of a multi-layer fluid transfer tape.
Figure 5:
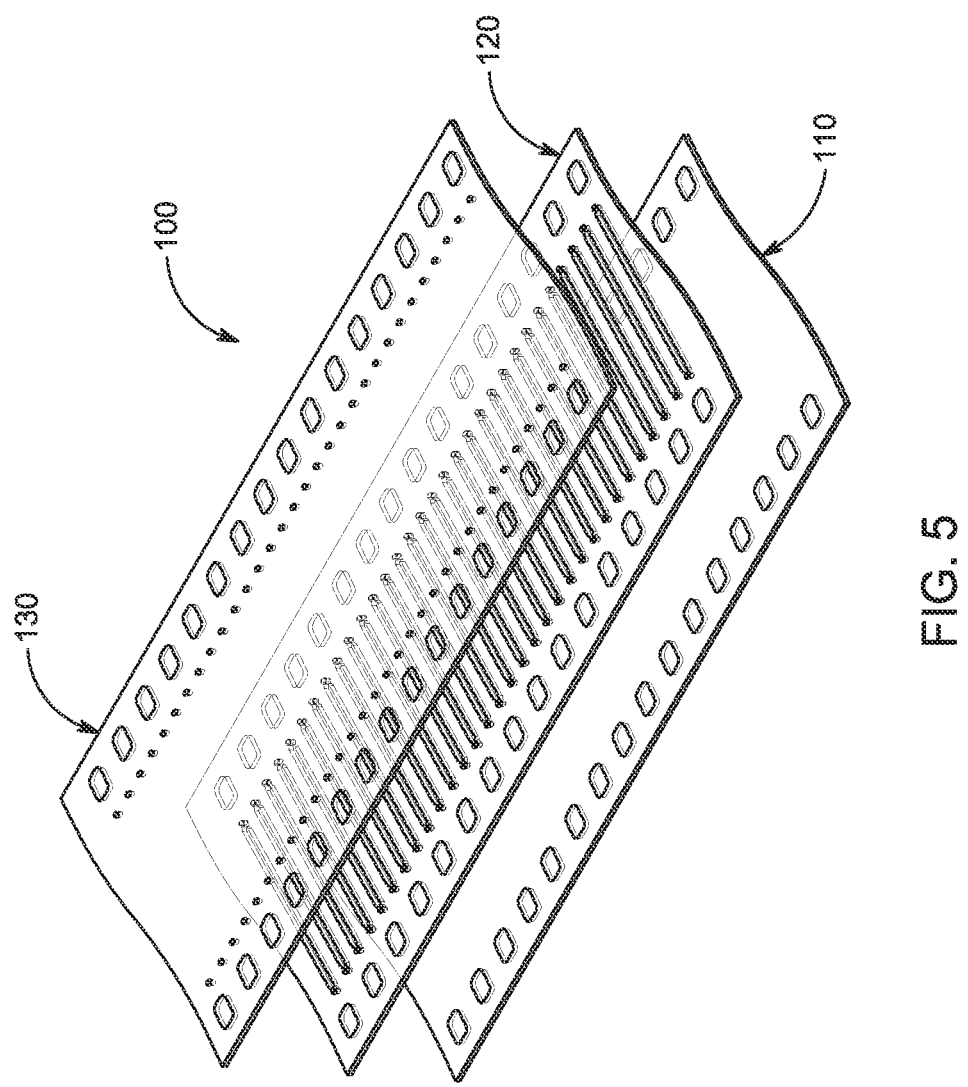
FIG. 5 is another exploded perspective view of the multi-layer fluid transfer tape of FIG. 4.

FIGS. 4 and 5 show an example of a multi-layer tape 100 in different exploded view perspectives. A base layer 110 may include a solid substrate 111 with notches 112 disposed adjacent outside edges 113, 114 of the base layer 110 and along the longitudinal axis of the base layer 110. The notches 112 may be configured to be engaged by a toothed gear or sprocket of a roller assembly.

An intermediate layer 120 may be disposed next to (e.g., on top of) the base layer 110, the intermediate layer 120 having notches 122 configured to be aligned with the base layer notches 112 along outside edges 123, 124 of the intermediate layer 120. Channels (e.g., slots, wells, reservoirs) 125 may be disposed in substrate 121, the channels 125 oriented transverse (e.g., perpendicularly, orthogonally) to the longitudinal axis of the intermediate layer 120. Each channel 125 may include an inlet 127 and an outlet 129.

An interface layer 130 may be disposed next to (e.g., on top of) the intermediate layer 120, the interface layer 130 having notches 132 configured to be aligned with the base and intermediate layer notches 112, 122 along outside edges 133, 134 of the interface layer 130. A substrate 131 may be solid in the central portion of the interface layer 130 in order to provide a cover or seal to the channels 125 of the intermediate layer 120. Inlets 137 and outlets 139 may be disposed in the substrate 131 and aligned with the inlets/outlets 127, 129 of the intermediate layer 120.

Figure 6:
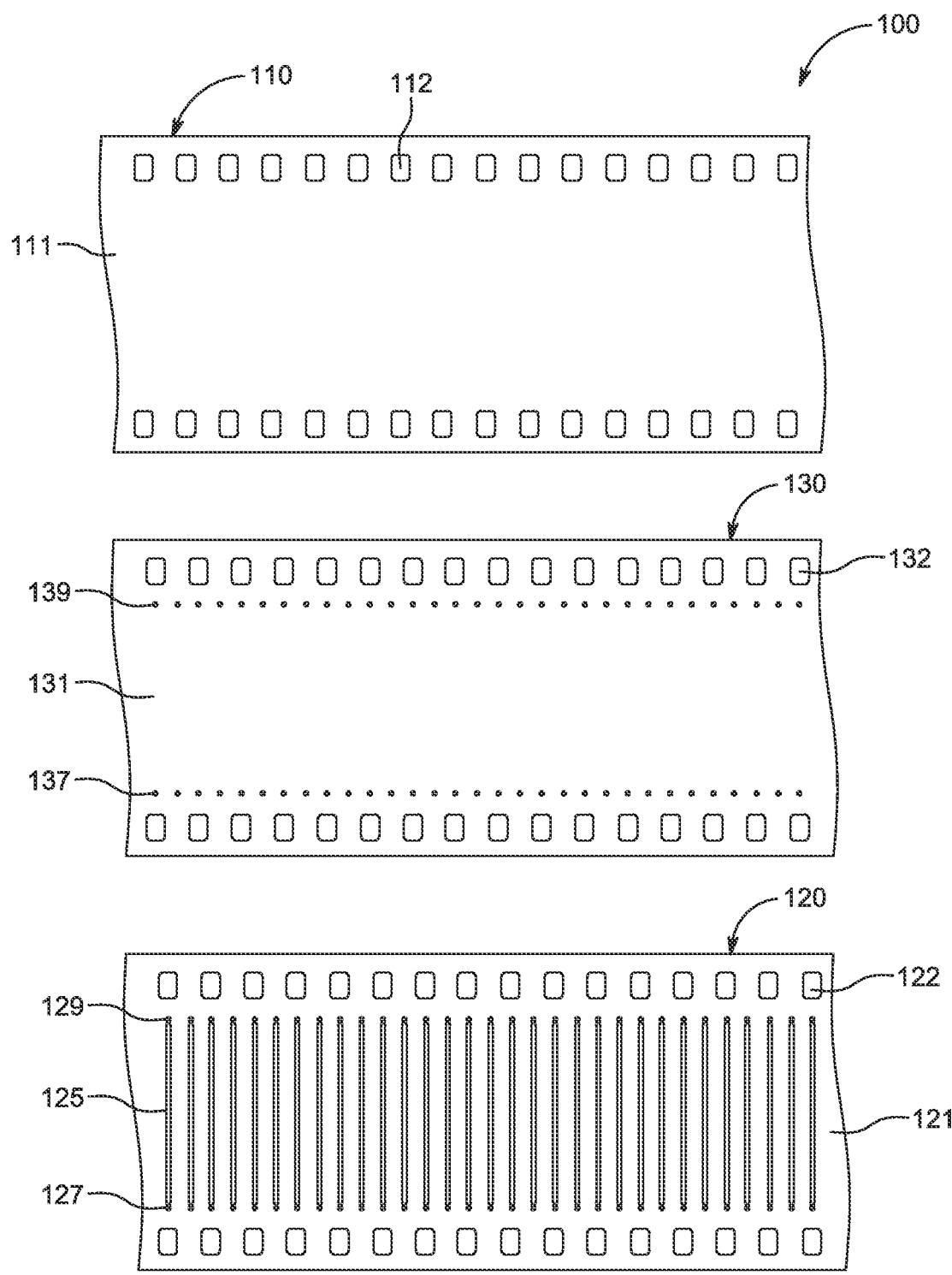
FIG. 6 is a top plan view of the layers of the multi-layer fluid transfer tape of FIG. 4.

FIG. 6 shows the layers 110, 120, 130 of the multi-layer tape 100 side by side for a different perspective. The channels 125 may be slots that pass all the way through the substrate 121 of the intermediate layer 120. Here, the substrates 111, 131 of the base and interface layers 110, 130 may provide covers or seals to the channels (e.g., slots) 125 such that the inlets/outlets 127, 129 are the only fluid entry and exit points for the channels 125. In another example, the channels 125 may be reservoirs that go partially into, but not all the way through, the substrate 121. Here, the base layer 110 is not necessary to seal or cover the bottom of the channels 125, though it will still provide a seal/cover to the inlets/outlets 127, 129.

Figure 7:
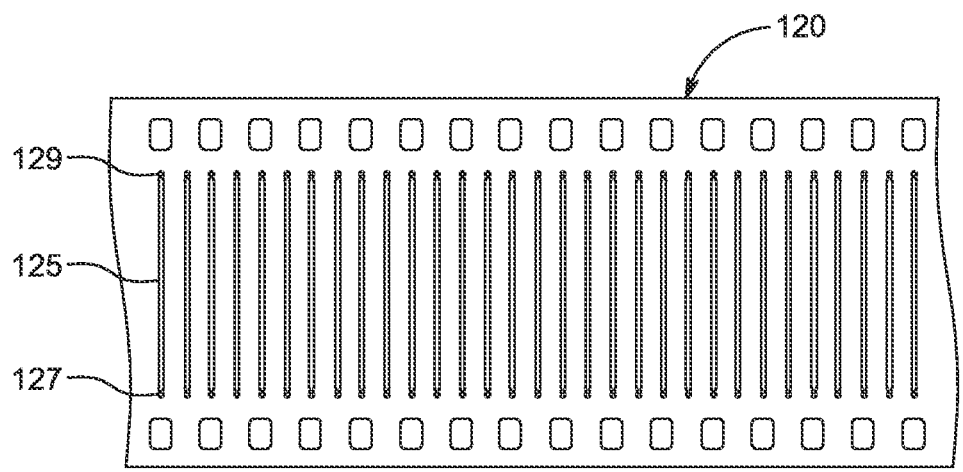
FIG. 7 is a top plan view of one of the layers of FIG. 6.
Figure 8:
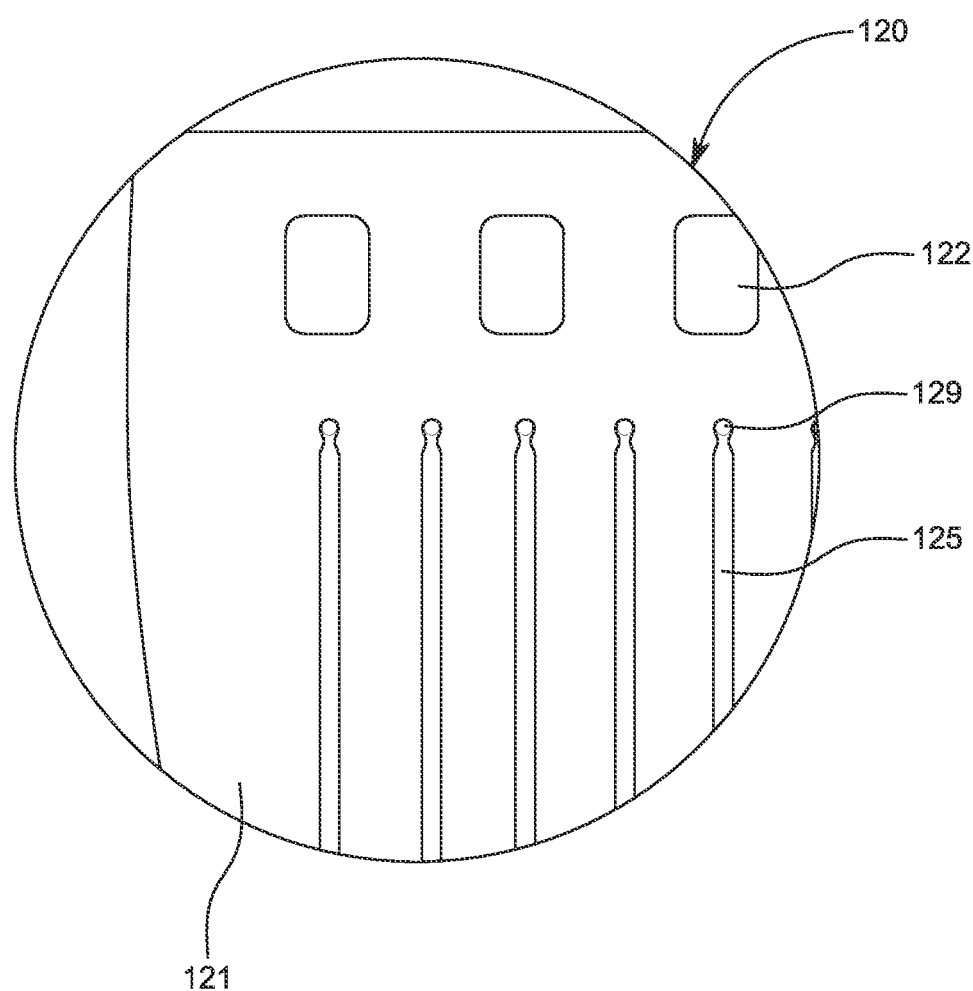
FIG. 8 is a magnified view of a portion of the layer of FIG. 7.

FIGS. 7 and 8 show intermediate layer 120 and a blown up portion of intermediate layer 120, respectively. Here, inlet ports 127 and outlet ports 129 are disposed at opposite ends of channels 125.

Figure 9:
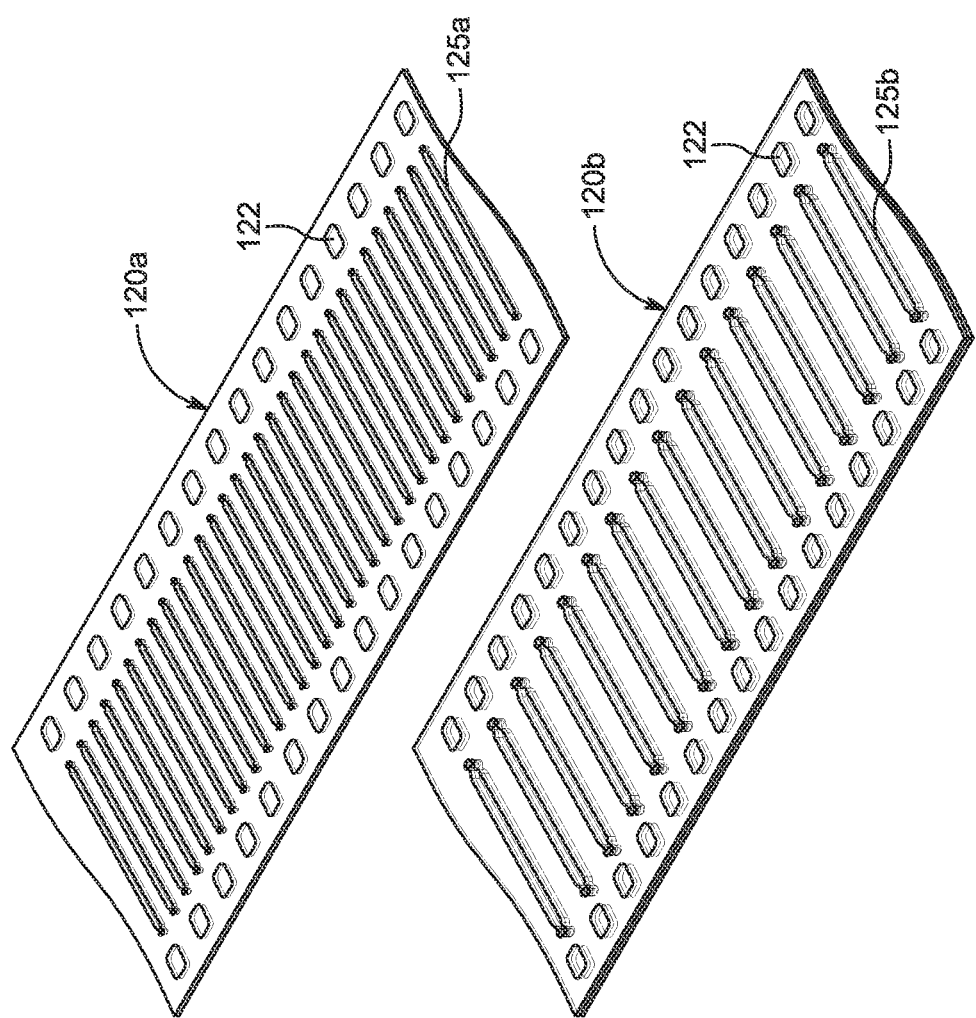
FIG. 9 is a perspective view of portions of two fluid transfer tapes.

FIG. 9 shows two versions of intermediate layers 120*a*, 120*b* having channels 125*a*, 125*b* with different sizing and spacing. Both intermediate layers 120*a*, 120*b* have similarly sized and spaced notches 122, while channels 125*a* are thin and spaced closely together on intermediate layer 120*a* and channels 125*b* are wider and spaced farther apart on intermediate layer 120*b*.

Figure 10:
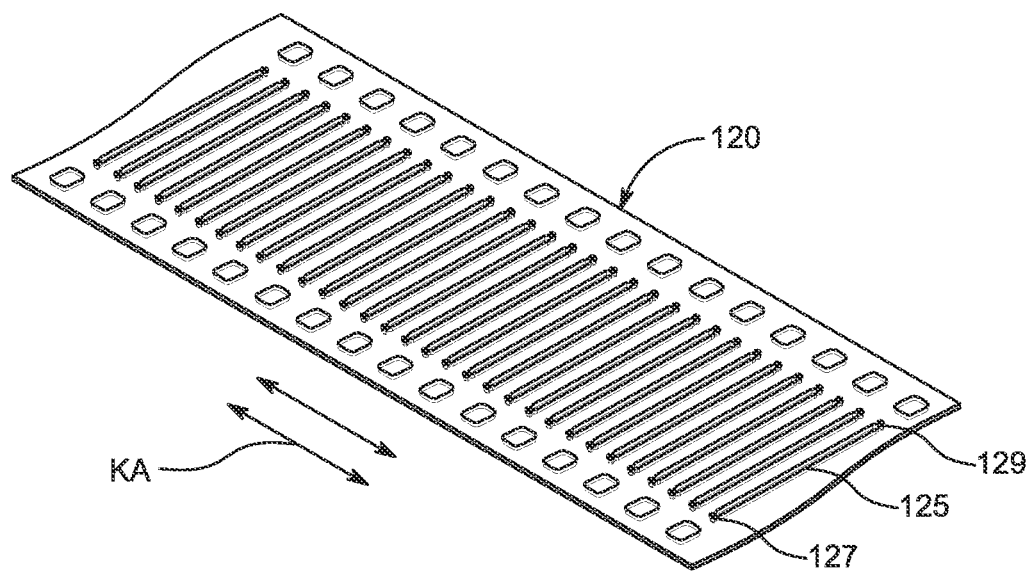
FIG. 10 is a perspective view of a portion of a fluid transfer tape.
Figure 11:
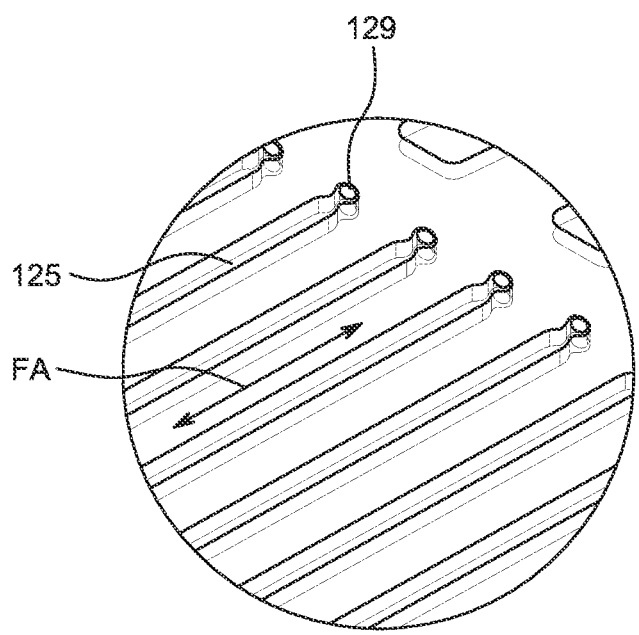
FIG. 11 is a magnified view of a portion of the fluid transfer tape of FIG. 10.

FIGS. 10 and 11 show intermediate layer 120 and a blown up portion of intermediate layer 120, respectively. Here, inlet ports 127 and outlet ports 129 are disposed at opposite ends of channels 125 as co-linear ports. The longitudinal axis of intermediate layer 120 may be associated with a direction of movement and labeled as kinetic axis KA. The channels 125 may be disposed orthogonally to the kinetic axis KA and labeled as fluidic axis FA. Here, a fluid may enter the channel 125 via an inlet port 127, flow along the fluidic axis FA of the channel 125 and exit the channel via an outlet port 129. Thus, flow of the fluid along the fluidic axis FA may occur simultaneously with movement of the channel 125 along the kinetic axis KA via movement of a multi-layer tape 100 with an intermediate layer 120 along a path of a roller assembly (e.g., fluidic transfer assembly 10).

The channel 125 may be uniformly configured as a single zone for fluidic operation(s) on a single biological sample (e.g., bodily fluid). The channel 125 may be configured as having multiple zones (e.g., specialized functional zones) configured so that a biological sample (e.g., bodily fluid) or a portion of a biological sample (e.g., bodily fluid) may be engaged or acted on by any combination of antibodies, reagents, temperatures and thermal conductivities, for example. For example, a biological sample (e.g., bodily fluid) in a first zone may be subjected to a first reagent and the biological sample (e.g., bodily fluid) in a second zone may be subjected to a second reagent. Movement of the reactants (e.g., antibodies, reagents) through the zones may occur by way of an induced pressure differential (e.g., fluid is pushed from a higher pressure in the first zone towards a lower pressure in the second zone).

Movement of reactants from zone to zone may occur via ingress (e.g., injection) or egress (e.g., ejection) of a specific volume of displacing fluid. Such movement may result in shifting the contents of the channel 125 (e.g., reactants, biological (e.g., bodily fluid) samples) along the fluidic axis FA. Such movement along the fluidic axis FA may be applied for the complete insertion or removal of a sample volume (e.g., reactants, biological (e.g., bodily fluid) samples), or to partially shift the sample volume incrementally. For example, an incremental movement of a sample volume may be performed so that each delineated fraction of the sample volume engages with or experiences each zone in the channel 125.

A sample volume or a fractional portion of a sample volume may be incrementally advanced across a sequence of reagents or antibodies embedded within or attached to the walls or the substrate of the channel 125. Similarly, a sample volume or a fractional portion of a sample volume may be incrementally advanced across a sequence of thermal states or thermal conditions defined within the channel 125.

A multi-layer tape 100 may be configured to detect and/or quantitate a biomolecule such as a DNA, cDNA, RNA, protein, virus, bacterium, glycoprotein, lipid, or carbohydrate in a biological sample. Such detection may be useful for medical, agricultural, or environmental, or security applications (e.g., homeland security such as airborne diseases including viruses). In another embodiment, the tape may be configured to perform an assay for the diagnosis of a disease or disorder. In still further embodiments, the tape may be configured to prepare, grow and/or culture a biological sample such as a cell including, for example, preparing and culturing cells for CAR-T therapy. In other embodiments, the tape may be configured to perform gene editing (e.g., using CRISPR).

The tape may be configured to detect the presence of a genetic mutation in a biological sample. A number of methods can be used to detect the presence of genetic mutations in the biological sample and/or to quantitate the expression of those mutations. The genetic mutations can include known mutations of specific genes as well as the presence or absence of an amplification of certain genes. Detection of genetic mutations can be performed at the protein level and/or the nucleic acid level.

For example, a multi-layer tape 100 may be configured to perform a polymerase chain reaction (PCR) process. For example, a multi-layer tape 100 may be configured to use any combination of zones and channels 125 to make several copies of a specific deoxyribonucleic acid (DNA) segment.

A biological sample may be dropletized before or during its movement through a channel. For example, the biological sample may be dropletized into nanoliter-sized or picoliter-sized droplets. Such droplets may comprises additional components for performing an analysis of the biological sample including, for example, components for performing PCR or immuno-PCR on the biological sample. The droplets may be read one at a time including past a fluorescence excitation source and detector to determine the presence or absence of a biomarker. In another embodiment, the biological sample may be dropletized during its movement through a channel by its interaction with the walls of the channel or its interaction by an external means (e.g., an electro/mechanical device).

Channels may comprise a nanopore for nucleotide sequencing (e.g., DNA or RNA sequencing). The identity of the nucleotide is determined by measuring a disruption in current as the nucleotide passes through or near the aperture of the nanopore. Other variations and embodiments of nanopores that may be implemented for use in the disclosure are well known in the art.

Figure 12:
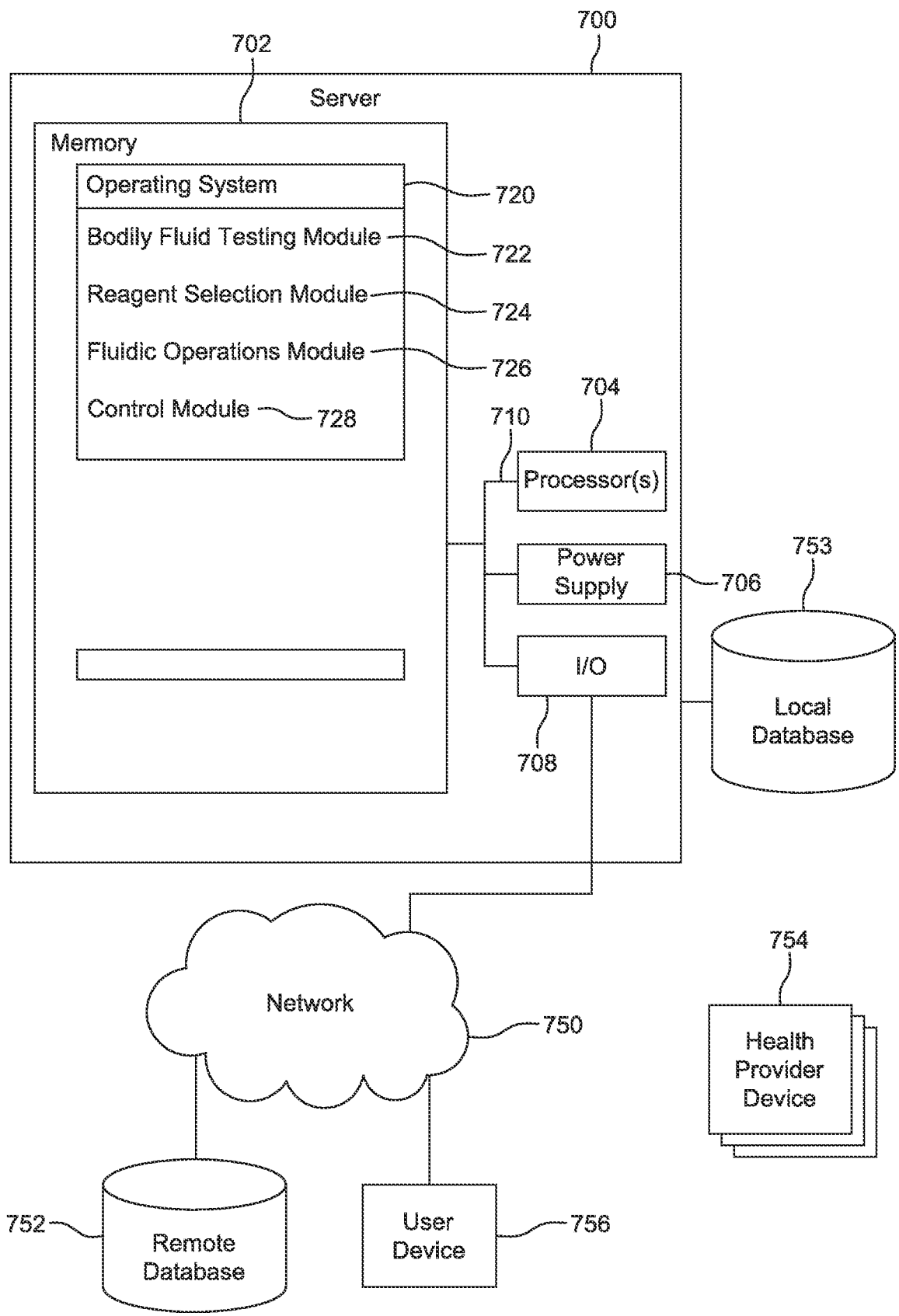
FIG. 12 is a system diagram of a computing system in accordance with some embodiments.

FIG. 12 is a system diagram of a server 700 (alternatively referred to herein as a "testing system," "computing system," or a "system"), in accordance with some embodiments. The server 700 typically includes a memory 702, one or more processors 704, a power supply 706, an input/output (I/O) subsystem 708, and a communication bus 710 for interconnecting these components.

The processor(s) 704 execute modules, programs, and/or instructions stored in the memory 702 and thereby perform processing operations.

In some embodiments, the memory 702 stores one or more programs (e.g., sets of instructions) and/or data structures, collectively referred to as "modules" herein. In some embodiments, the memory 702, or the non-transitory computer readable storage medium of the memory 702 stores the following programs, modules, and data structures, or a subset or superset thereof:
- an operating system 720;
- a biological sample (e.g., bodily fluid) testing module 722, which determines attributes of biological (e.g., bodily fluid) samples based on reagents and/or fluidic operations;
- a reagent selection module 724 for determining one or more reagents for use in testing of a given biological (e.g., bodily fluid) sample;
- a fluidic operations module 726 for determining one or more fluidic operations to be carried out on a given biological (e.g., bodily fluid) sample; and
- a control module 728 for controlling a fluidic tape assembly.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 702 stores a subset of the modules identified above. In some embodiments, a remote database 752 and/or a local database 753 store a portion or all of one or more modules identified above (such as the biological sample (e.g., bodily fluid) testing module 722, the reagent selection module 724, the fluidic operations module 726, and/or the control module 728). Furthermore, the memory 702 may store additional modules not described above.

In some embodiments, the modules stored in the memory 702, or a non-transitory computer readable storage medium of the memory 702, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 704. In some embodiments, one or more of the modules described with regard to the memory 702 is implemented in the memory of a health provider computing device 754 (e.g., a computing device of a medical provider in the context of a doctor/patient, the patient being the subject of the biological sample (e.g., bodily fluid) testing), and executed by processor(s) of the provider device 754. In some embodiments, one or more of the modules described with regard to the memory 702 is implemented in the memory of a user device 756 (e.g., a computing device of the patient subject to the biological sample (e.g., bodily fluid) testing) and executed by processor(s) of the user device 756. For example, biological sample (e.g., bodily fluid) testing module 722 may be distributed across server 700, provider device(s) 754, and/or user device 756.

In some embodiments, the I/O subsystem 708 communicatively couples the server 700 to one or more devices, such as a local database 753, a remote database 752, a health provider computing device 754, and/or a user device 756 via a communications network 750 and/or via a wired and/or wireless connection. In some embodiments, the communications network 750 is the Internet. In some embodiments, the server 700 is a computing system local to a health facility at which the health provider and/or the user (also referred to herein as a patient or subject) is located. In some embodiments, the server 700 is remotely located with regard to the location of the health provider and/or the user. In some embodiments, one or more, or all, of the modules, components, and/or data described with regard to the server 700 is present, or otherwise implemented, in one or more of the health provider computing devices 754 and/or a user computing device 756.

The communication bus 710 optionally includes circuitry (sometimes called a chipset) that interconnects and controls communications between system components.

Figure 13:
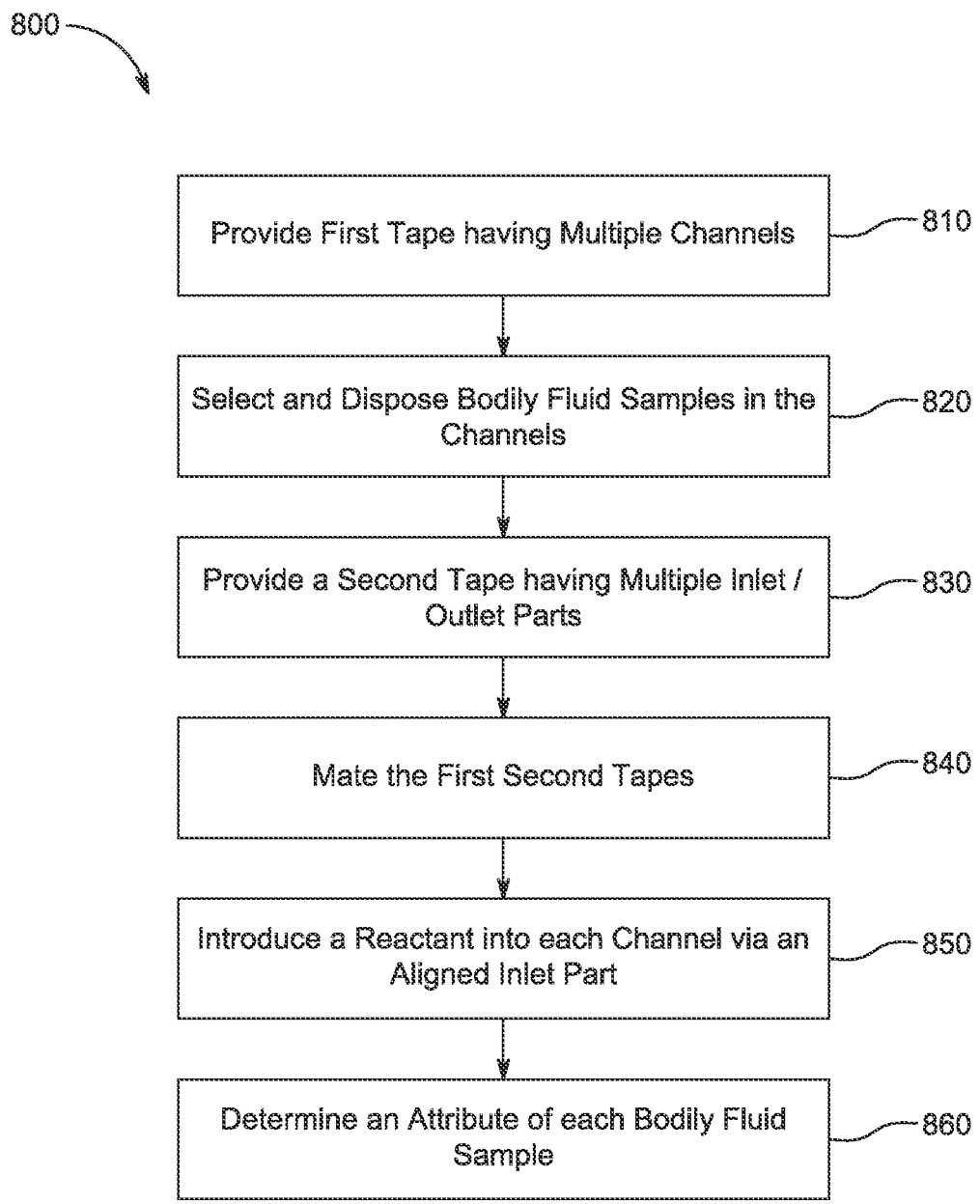
FIG. 13 is a schematic diagram of a method of biological sample (e.g., bodily fluid) testing in accordance with some embodiments.
Figure 14:
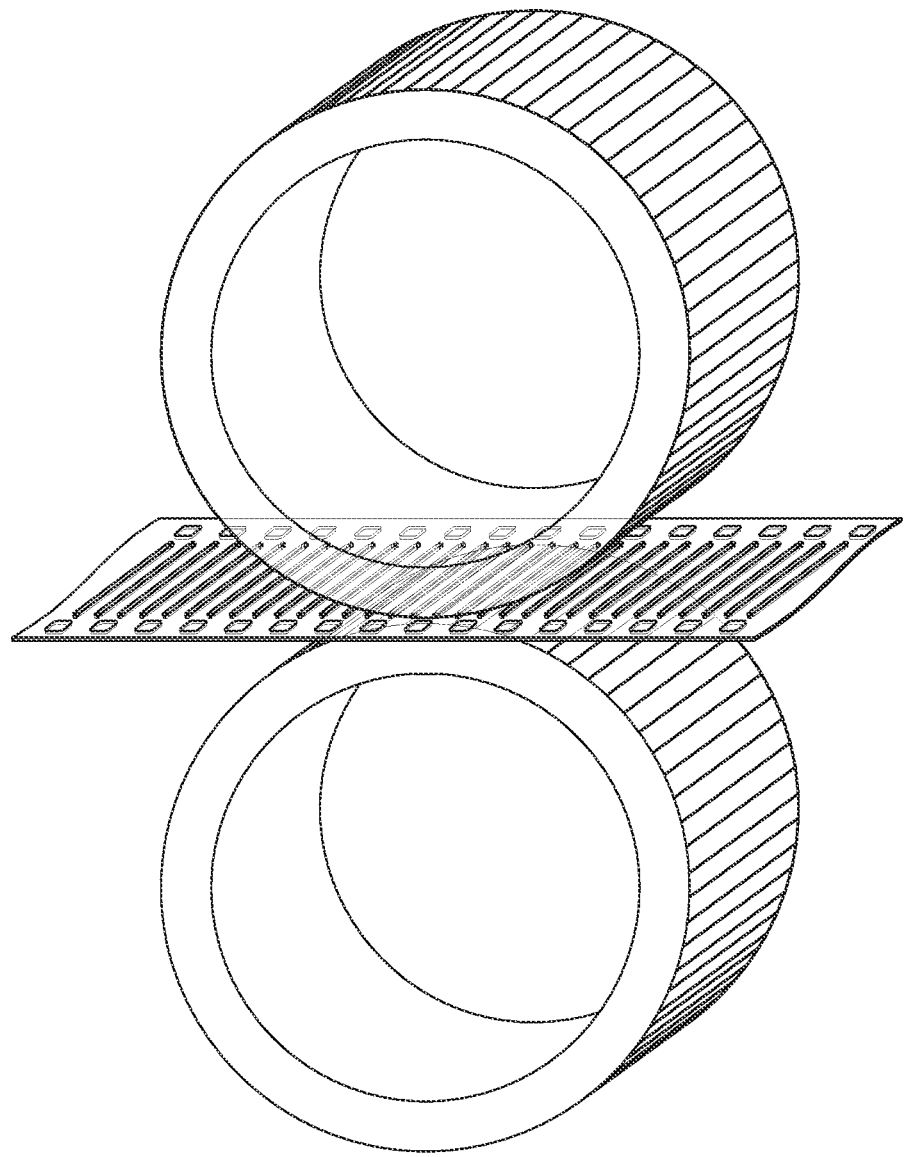
FIG. 14 is a front view of a fluidic transfer assembly including a first tape and a second tape passing through two confinement rollers.

FIG. 13 is a flow diagram illustrating a method 800 of biological sample (e.g., bodily fluid) testing in accordance with some embodiments. The method is performed at a server 700, a healthcare provider computing device 754, and/or a user device 756. For example, instructions for performing the method are stored in the memory 702 and executed by the processor(s) 704 of the server 700. In some embodiments, part or all of the instructions for performing the method are stored in memory and executed by processor(s) of the provider device 754 and/or the user device 756.

In step 810, a first tape comprising a plurality of channels is provided, each channel having one or more channel ports. For example, each channel may have one inlet port and one outlet port, providing a fluid pathway from the inlet port, through the channel to the outlet port.

Targeted biological (e.g., bodily fluid) samples are selected and disposed into the channels in step 820. For example, multiple portions from a single biological (e.g., bodily fluid) sample may be disposed in multiple channels. As another example, each channel may have a different type of biological (e.g., bodily fluid) sample disposed within.

In step 830, a second tape is provided, the second tape having multiple inlet/outlet ports. For example, the inlet/ outlet ports of the second tape may be configured to align with the inlet/outlet ports of the channels in the first tape.

The first tape is engaged or mated with the second tape in step 840. For example, the first and second tapes may be fed or wound through a roller assembly in which compression rollers squeeze the first and second tapes together as they move around a fluidic operations roller.

In step 850, a reactant (e.g., reagent such as an antibody) is introduced into each channel of the first tape via an aligned inlet port of the second tape. For example, the reagent may be a fluid that is flowed into the channel via the aligned ports of the first and second tapes, causing the reagent to combine with the biological (e.g., bodily fluid) sample disposed in the channel.

The combined reagent/biological (e.g., bodily fluid) sample may then be utilized to determine one or more attributes of the biological (e.g., bodily fluid) sample in step 860. For example, the combined reagent/biological (e.g., bodily fluid) sample may by observed for a specific effect (e.g., color change, fluorescence, electrical or magnetic properties), transferred to a testing apparatus, or stored for use in a later testing step.

In one or more embodiments, methods for testing a biological sample (e.g., bodily fluid) of a subject are provided. The methods include providing a first tape comprising a plurality of channels, each channel having one or more channel ports; disposing a sample of the biological sample (e.g., bodily fluid) into a first channel; providing a second tape comprising a plurality of inlet/outlet ports; engaging the first tape with the second tape to align a first inlet/outlet port with a first channel port of the first channel; and introducing a reagent into the first channel through the first inlet/outlet port and the aligned first channel port.

In some embodiments of each or any of the above- or below-mentioned embodiments, the methods further comprise withdrawing a portion of the reagent from the first channel via a second channel port aligned with a second inlet/outlet port.

In some embodiments of each or any of the above- or below-mentioned embodiments, the methods further comprise withdrawing a portion of the biological sample (e.g., bodily fluid) from the first channel via a second channel port aligned with a second inlet/outlet port.

In some embodiments of each or any of the above- or below-mentioned embodiments, the methods further comprise withdrawing a mixture of the biological sample (e.g., bodily fluid) and the reagent from the first channel via a second channel port aligned with a second inlet/outlet port.

In some embodiments of each or any of the above- or below-mentioned embodiments, the first tape comprises a first kinetic axis defined by a longitudinal edge of the first tape, and wherein the first tape is configured to be moved along the first kinetic axis.

In some embodiments of each or any of the above- or below-mentioned embodiments, the second tape comprises a second kinetic axis defined by a longitudinal edge of the second tape, and wherein the second tape is configured to be moved along the second kinetic axis.

In some embodiments of each or any of the above- or below-mentioned embodiments, the first channel is disposed on the first tape along a fluidic axis, wherein the fluidic axis is orthogonal to the kinetic axis.

In some embodiments of each or any of the above- or below-mentioned embodiments, the first channel is configured to retain any of the biological sample (e.g., bodily fluid), the reagent and a combination thereof during movement of the first tape along the kinetic axis.

In some embodiments of each or any of the above- or below-mentioned embodiments, the engaging the first tape with the second tape comprises compressing the first and second tapes together with compression rollers.

In some embodiments of each or any of the above- or below-mentioned embodiments, the first tape and the second tape are moved by a serpentine belt assembly.

In some embodiments of each or any of the above- or below-mentioned embodiments, the serpentine belt assembly provides circuitous pass-through for tape-to-tape transfer of mated port faces.

In some embodiments of each or any of the above- or below-mentioned embodiments, the serpentine belt assembly provides high-speed mixing or transfer under high confinement.

In some embodiments of each or any of the above- or below-mentioned embodiments, the methods further comprise disposing an initial reagent in the first channel prior to disposing the biological (e.g., bodily fluid) sample in the first channel.

In some embodiments of each or any of the above- or below-mentioned embodiments, the methods further comprise introducing a second reagent into the first channel through the first inlet/outlet port and the aligned first channel port.

In some embodiments of each or any of the above- or below-mentioned embodiments, the methods further comprise withdrawing a portion of the second reagent from the first channel via the second channel port through the second inlet/outlet port.

In some embodiments of each or any of the above- or below-mentioned embodiments, the methods further comprise withdrawing a portion of the biological sample (e.g., bodily fluid) from the first channel via the second channel port through the second inlet/outlet port.

In some embodiments of each or any of the above- or below-mentioned embodiments, the methods further comprise withdrawing a mixture of the biological sample (e.g., bodily fluid) and the second reagent from the first channel via the second channel port through the second inlet/outlet port.

In some embodiments of each or any of the above- or below-mentioned embodiments, the methods further comprise withdrawing a mixture of the biological sample (e.g., bodily fluid), the first reagent and the second reagent from the first channel via the second channel port through the second inlet/outlet port.

In some embodiments of each or any of the above- or below-mentioned embodiments, the methods further comprise moving the first tape relative to the second tape to align a third inlet/outlet port with the first channel port of the first channel and a fourth inlet/outlet port with the second channel port of the first channel.

In some embodiments of each or any of the above- or below-mentioned embodiments, the methods further comprise introducing a second reagent into the first channel through the third inlet/outlet port and the aligned first channel port.

In some embodiments of each or any of the above- or below-mentioned embodiments, the methods further comprise withdrawing a portion of the second reagent from the first channel via the second channel port through the fourth inlet/outlet port.

In some embodiments of each or any of the above- or below-mentioned embodiments, the methods further comprise withdrawing a portion of the biological sample (e.g., bodily fluid) from the first channel via the second channel port through the fourth inlet/outlet port.

In some embodiments of each or any of the above- or below-mentioned embodiments, the methods further comprise withdrawing a mixture of the biological sample (e.g., bodily fluid) and the second reagent from the first channel via the second channel port through the fourth inlet/outlet port.

In some embodiments of each or any of the above- or below-mentioned embodiments, the methods further comprise withdrawing a mixture of the biological sample (e.g., bodily fluid), the first reagent and the second reagent from the first channel via the second channel port through the fourth inlet/outlet port.

In some embodiments of each or any of the above- or below-mentioned embodiments, the reagent is introduced into the first channel by compressive force.

In some embodiments of each or any of the above- or below-mentioned embodiments, the reagent is introduced into the first channel by air pressure.

In some embodiments of each or any of the above- or below-mentioned embodiments, the reagent is introduced into the first channel by a heating process.

In some embodiments of each or any of the above- or below-mentioned embodiments, the methods further comprise engaging a third tape with the first tape, wherein the third tape and the second tape are disposed on opposite sides of the first tape.

In some embodiments of each or any of the above- or below-mentioned embodiments, the third tape is configured to block the channel ports on that side of the first tape.

In some embodiments of each or any of the above- or below-mentioned embodiments, the first tape comprises engagement openings disposed along first and second longitudinal sides.

In some embodiments of each or any of the above- or below-mentioned embodiments, the engagement openings are configured to be received by gear teeth, and wherein movement of the gear teeth causes movement of the first tape along the first kinetic axis.

In some embodiments of each or any of the above- or below-mentioned embodiments, the second tape comprises engagement openings disposed along first and second longitudinal sides.

In some embodiments of each or any of the above- or below-mentioned embodiments, the engagement openings are configured to be received by gear teeth, and wherein movement of the gear teeth causes movement of the second tape along the second kinetic axis.

In some embodiments of each or any of the above- or below-mentioned embodiments, the methods further comprise observing a reaction from mixing the first reagent and the biological sample (e.g., bodily fluid) in the first channel.

In some embodiments of each or any of the above- or below-mentioned embodiments, the reaction is a change in color.

In some embodiments of each or any of the above- or below-mentioned embodiments, the methods further comprise introducing the withdrawn mixture of the biological sample (e.g., bodily fluid) and the reagent to a test assembly; and observing a reaction from the mixture of the biological sample (e.g., bodily fluid) and the reagent with the test assembly.

In some embodiments of each or any of the above- or below-mentioned embodiments, the methods further comprise providing a selectable and adaptable intermittent assembly of purposeful fluidic layers.

In some embodiments of each or any of the above- or below-mentioned embodiments, the first tape includes a plurality of layers comprising: a first channel layer having a first plurality of channels disposed thereon; a first port layer having a first plurality of channel ports and a first plurality of inlet/outlet ports, each aligned with the first plurality of channels; and a backing layer, wherein the first channel layer is sandwiched between the first port layer and the backing layer.

In some embodiments of each or any of the above- or below-mentioned embodiments, the second tape includes a plurality of layers comprising: a second channel layer having a second plurality of channels and a second plurality of inlet/outlet ports disposed thereon; a second port layer having a second plurality of channel ports aligned with the second plurality of channels and a third plurality of inlet/outlet ports; and a third port layer having a fourth plurality of inlet/outlet ports, wherein the channel layer is sandwiched between the second and third port layers, and wherein the second, third and fourth inlet/outlet ports are aligned.

In some embodiments of each or any of the above- or below-mentioned embodiments, the engaging the first tape with the second tape provides a serpentine flow path in through an aligned set of second, third and fourth inlet/outlet ports, into a first inlet/outlet port, through a first channel, out a first channel port into a second channel port, through a second channel and out another fourth inlet/outlet port.

In one or more embodiments, methods for testing a biological sample (e.g., bodily fluid) of a subject are provided. The methods include providing a first tape comprising a plurality of channels, each channel having one or more channel ports; disposing a reagent into a first channel; providing a second tape comprising a plurality of inlet/outlet ports; engaging the first tape with the second tape to align a first inlet/outlet port with a first channel port of the first channel; and introducing a sample of the biological sample (e.g., bodily fluid) into the first channel through the first inlet/outlet port and the aligned first channel port.

Features of the embodiments described herein can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 104 and 204. The memory 102 and the memory 202, or alternatively the non-volatile memory device(s) within these memories, comprises a non-transitory computer readable storage medium.

Communication systems as referred to herein (e.g., the communication system 108 and the communication system 208) optionally communicate via wired and/or wireless communication connections. Communication systems optionally communicate with networks (e.g., the networks 150 and 152), such as the Internet, also referred to as the World Wide Web (WWW), an intranet and/or a wireless network, such as a cellular telephone network, a wireless local area network (LAN) and/or a metropolitan area network (MAN), and other devices by wireless communication.

Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Although the disclosure has been described and illustrated with a certain degree of particularity, it is understood that the present disclosure has been made only by way of example, and that numerous changes in the combination and arrangement of parts can be resorted to by those skilled in the art without departing from the scope of the disclosure, as hereinafter claimed.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified samples or steps and those that do not materially affect the basic and novel characteristic(s). Embodiments of the disclosure so claimed are inherently or expressly described and enabled herein.

Thus, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, or operations in the processes or methods disclosed are illustrations of exemplary approaches. Based upon implementation preferences or scenarios, it is understood that the specific order or hierarchy of steps, operations or processes may be rearranged. Some of the steps, operations or processes may be performed simultaneously. In some implementation preferences or scenarios, certain operations may or may not be performed. Some or all of the steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary and Brief Description of the Drawings are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims reflect, inventive subject matter lies in less than all features of a single disclosed configuration or operation.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method for testing a biological sample, the method comprising:
   providing a first tape comprising a plurality of channels, each channel having one or more channel ports;
   disposing the sample into a first channel;
   providing a second tape comprising a plurality of inlet/outlet ports;
   engaging the first tape with the second tape to align a first inlet/outlet port with a first channel port of the first channel;
   introducing a reagent into the first channel through the first inlet/outlet port and the aligned first channel port; and
   withdrawing a portion of the reagent from the first channel via a second channel port aligned with a second inlet/outlet port.

2. The method of claim 1, further comprising withdrawing a portion of the biological sample from the first channel via a second channel port aligned with a second inlet/outlet port.

3. The method of claim 1, further comprising withdrawing a mixture of the biological sample and the reagent from the first channel via a second channel port aligned with a second inlet/outlet port.

4. The method of claim 1, wherein the serpentine belt assembly provides circuitous pass-through for tape-to-tape transfer of mated port faces.

5. The method of claim 1, further comprising introducing a second reagent into the first channel through the first inlet/outlet port and the aligned first channel port.

6. The method of claim 5, further comprising withdrawing a portion of the second reagent from the first channel via the second channel port through the second inlet/outlet port.

7. The method of claim 5, further comprising withdrawing a portion of the biological sample from the first channel via the second channel port through the second inlet/outlet port.

8. The method of claim 5, further comprising withdrawing a mixture of the biological sample and the second reagent from the first channel via the second channel port through the second inlet/outlet port.

9. The method of claim 5, further comprising withdrawing a mixture of the biological sample, the first reagent and the second reagent from the first channel via the second channel port through the second inlet/outlet port.

10. The method of claim 1, further comprising moving the first tape relative to the second tape to align a third inlet/outlet port with the first channel port of the first channel and a fourth inlet/outlet port with the second channel port of the first channel.

11. The method of claim 10, further comprising introducing a second reagent into the first channel through the third inlet/outlet port and the aligned first channel port.

12. The method of claim 11, further comprising withdrawing a portion of the second reagent from the first channel via the second channel port through the fourth inlet/outlet port.

13. The method of claim 11, further comprising withdrawing a portion of the biological sample from the first channel via the second channel port through the fourth inlet/outlet port.

14. The method of claim 11, further comprising withdrawing a mixture of the biological sample and the second reagent from the first channel via the second channel port through the fourth inlet/outlet port.

15. The method of claim 11, further comprising withdrawing a mixture of the biological sample, the first reagent and the second reagent from the first channel via the second channel port through the fourth inlet/outlet port.

16. The method of claim 1, wherein the reagent is introduced into the first channel by compressive force.

17. The method of claim 1, wherein the reagent is introduced into the first channel by air pressure.

18. The method of claim 1, further comprising engaging a third tape with the first tape, wherein the third tape and the second tape are disposed on opposite sides of the first tape.

19. The method of claim 18, wherein the third tape is configured to block the channel ports on that side of the first tape.

20. The method of claim 1, wherein the second tape comprises engagement openings disposed along first and second longitudinal sides.

21. The method of claim 20, wherein the engagement openings are configured to be received by gear teeth, and wherein movement of the gear teeth causes movement of the second tape along the second kinetic axis.

22. The method of claim 3, further comprising:
   introducing the withdrawn mixture of the biological sample and the reagent to a test assembly; and
   observing a reaction from the mixture of the biological sample and the reagent with the test assembly.

23. The method of claim 1, wherein the first tape includes a plurality of layers comprising:
- a first channel layer having a first plurality of channels disposed thereon;
- a first port layer having a first plurality of channel ports and a first plurality of inlet/outlet ports, each aligned with the first plurality of channels; and
- a backing layer,
- wherein the first channel layer is sandwiched between the first port layer and the backing layer.

24. The method of claim 23, wherein the second tape includes a plurality of layers comprising:
- a second channel layer having a second plurality of channels and a second plurality of inlet/outlet ports disposed thereon;
- a second port layer having a second plurality of channel ports aligned with the second plurality of channels and a third plurality of inlet/outlet ports; and
- a third port layer having a fourth plurality of inlet/outlet ports,
- wherein the channel layer is sandwiched between the second and third port layers, and
- wherein the second, third and fourth inlet/outlet ports are aligned.

25. The method of claim 24, wherein the engaging the first tape with the second tape provides a serpentine flow path in through an aligned set of second, third and fourth inlet/outlet ports, into a first inlet/outlet port, through a first channel, out a first channel port into a second channel port, through a second channel and out another fourth inlet/outlet port.

* * * * *